(12) United States Patent
Domprobst et al.

(10) Patent No.: US 11,691,464 B2
(45) Date of Patent: Jul. 4, 2023

(54) METHODS FOR DETECTING AND LOCATING A THERMAL ANOMALY FOR A MOUNTED ASSEMBLY OF A VEHICLE

(71) Applicant: COMPAGNIE GENERALE DES ETABLISSEMENTS MICHELIN, Clermont-Ferrand (FR)

(72) Inventors: Frederic Domprobst, Clermont-Ferrand (FR); Vincent Pilon, Clermont-Ferrand (FR)

(73) Assignee: COMPAGNIE GENERALE DES ETABLISSEMENTS MICHELIN, Clermont-Ferrand (FR)

(*) Notice: Subject to any disclaimer, the term of this patent is extended or adjusted under 35 U.S.C. 154(b) by 207 days.

(21) Appl. No.: 17/256,259

(22) PCT Filed: Jun. 11, 2019

(86) PCT No.: PCT/EP2019/065247
§ 371 (c)(1),
(2) Date: Dec. 28, 2020

(87) PCT Pub. No.: WO2020/001975
PCT Pub. Date: Jan. 2, 2020

(65) Prior Publication Data
US 2021/0229508 A1 Jul. 29, 2021

(30) Foreign Application Priority Data
Jun. 28, 2018 (FR) ...................................... 1855830

(51) Int. Cl.
*B60C 23/04* (2006.01)
*B60C 23/20* (2006.01)

(52) U.S. Cl.
CPC .......... *B60C 23/0476* (2013.01); *B60C 23/20* (2013.01)

(58) Field of Classification Search
CPC ............ B60C 23/0408; B60C 23/0496; B60C 23/061; B60C 23/0494; B60C 23/0416;
(Continued)

(56) References Cited

U.S. PATENT DOCUMENTS 4,893,110 A * 1/1990 Hebert .................... B60C 23/20
 73/146.5
2006/0235651 A1* 10/2006 Rimkus ............... B60C 23/0476
 702/183

(Continued)

FOREIGN PATENT DOCUMENTS

FR 2680135 A1 2/1993
WO WO9003895 A1 * 4/1990
(Continued)

OTHER PUBLICATIONS

International Search Report dated Sep. 2, 2019, in corresponding PCT/EP2019/065247 (4 pages).

*Primary Examiner* — Andre J Allen
(74) *Attorney, Agent, or Firm* — Venable LLP

(57) ABSTRACT

A method for detecting a thermal anomaly during running of a tire-wheel assembly (3) of a vehicle (1) equipped with a mounting wheel (5) on which a pneumatic tire is mounted comprises the steps of measuring the internal pressure (P) and temperature (T) of the tire-wheel assembly (3) using a sensor (9) attached to the mounting wheel (5), calculating a monitoring ratio which is a function of the measured pressure and of the measured temperature, repeating the preceding steps and tracking the evolution in the value of the monitoring ratio in order to determine a thermal anomaly.

10 Claims, 3 Drawing Sheets

(58) Field of Classification Search
CPC . B60C 23/0433; B60C 23/0493; B60C 19/00; B60C 23/04; B60C 23/041; B60C 23/0462; B60C 23/0411; B60C 23/20; B60C 23/0444; B60C 11/24; B60C 23/0479; B60C 23/064; B60C 23/007; B60C 23/062; B60C 23/0401; B60C 23/0413; B60C 23/0488; B60C 23/06; B60C 23/043; B60C 23/0452; B60C 23/0467; B60C 11/246; B60C 23/0498; B60C 23/02; B60C 99/006; B60C 23/0428; B60C 23/0442; B60C 23/009; B60C 2019/004; B60C 23/0425; B60C 11/243; B60C 23/004; B60C 23/00354; B60C 23/045; B60C 23/0464; B60C 23/003; B60C 23/00318; B60C 23/0472; B60C 23/066; B60C 23/00372; B60C 23/0403; B60C 23/04985; B60C 23/0406; B60C 29/02; B60C 11/00; B60C 23/006; B60C 23/00; B60C 23/044; B60C 23/008; B60C 23/0455; B60C 23/0454; B60C 23/0483; B60C 23/0461; B60C 23/0474; B60C 23/0415; B60C 23/0491; B60C 23/0489; B60C 25/002; B60C 29/064; B60C 23/00363; B60C 11/0318; B60C 23/0459; B60C 23/0471; B60C 23/0481; B60C 2019/005; B60C 23/002; B60C 23/042; B60C 2200/02; B60C 23/0422; B60C 23/0423; B60C 23/0466; B60C 23/0477; B60C 23/0405; B60C 29/06; B60C 13/001; B60C 23/0437; B60C 23/0476; B60C 25/132; B60C 23/0447; B60C 23/0427; B60C 23/0449; B60C 25/00; B60C 9/18; B60C 23/0484; B60C 13/00; B60C 19/003; B60C 23/065; B60C 23/00336; B60C 23/0486; B60C 23/08; B60C 17/00; B60C 2019/006; B60C 23/001; B60C 25/142; B60C 17/02; B60C 23/00345; B60C 23/0445; B60C 5/004; B60C 11/0083; B60C 25/145; B60C 29/00; B60C 9/02; B60C 11/0332; B60C 23/0457; B60C 25/18; B60C 11/13; B60C 23/0418; B60C 23/0469; B60C 23/12; B60C 29/066; B60C 23/068; B60C 25/005; B60C 25/138; B60C 11/03; B60C 23/005; B60C 23/0432; B60C 3/00; B60C 5/14; B60C 99/00; B60C 11/11; B60C 17/04; B60C 17/06; B60C 23/063; B60C 23/10; B60C 25/007; B60C 25/0554; B60C 25/14; B60C 29/062; B60C 99/003; B60C 11/032; B60C 11/12; B60C 13/003; B60C 19/001; B60C 23/0435; B60C 23/126; B60C 23/127; B60C 23/16; B60C 29/068; B60C 3/04; B60C 9/20; B60C 11/01; B60C 11/0302; B60C 13/02; B60C 25/056; B60C 29/005; B60C 29/04; B60C 5/142; B60C 11/0304; B60C 11/0306; B60C 15/06; B60C 2009/2038; B60C 2011/0374; B60C 2011/0388; B60C 2011/1213; B60C 11/1231; B60C 2011/1245; B60C 2200/065; B60C 23/00305; B60C 23/067; B60C 23/131; B60C 23/135; B60C 23/137; B60C 23/18; B60C 25/02; B60C 7/12; B60C 11/02; B60C 17/0009; B60C 19/002; B60C 19/08; B60C 19/12; B60C 2019/007; B60C 23/00347; B60C 25/05; B60C 5/001; B60C 5/22; B60C 1/0008; B60C 1/0016; B60C 11/0058; B60C 11/0311; B60C 11/033; B60C 11/1218; B60C 11/124; B60C 11/1384; B60C 13/04; B60C 15/0036; B60C 15/024; B60C 17/041; B60C 17/066; B60C 2007/005; B60C 2009/0071; B60C 2009/2022; B60C 2009/2025; B60C 2011/0358; B60C 2011/1254; B60C 2017/068; B60C 2200/06; B60C 2200/12; B60C 2200/14; B60C 23/121; B60C 23/123; B60C 23/133; B60C 25/0503; B60C 25/0515; B60C 25/0521; B60C 25/0551; B60C 25/15; B60C 25/16; B60C 29/007; B60C 3/06; B60C 5/002; B60C 5/02; B60C 5/20; B60C 7/00; B60C 7/105; B60C 9/005; B60C 9/1807; B60C 9/28; B60C 2011/0033; B60C 23/085; B60C 25/0548; B60C 25/185; B60C 7/107; B60C 9/22; G01M 17/02; G01M 17/022; G01M 17/027; G01M 17/021; G01M 17/024; G01M 17/025; G01M 17/013; G01M 17/007; G01M 1/045; G01M 17/06; G01M 1/02; G01M 1/326; G01M 1/30; G01M 5/0058; G01M 1/26; G01M 17/0074; G01M 1/225; G01M 17/04; G01M 17/065; G01M 17/0072; G01M 17/10; G01M 7/00; G01M 1/16; G01M 99/00; G01M 7/08; G01M 1/34; G01M 17/028; G01M 17/045; G01M 3/3218; G01M 1/04; G01M 3/40; G01M 17/08; G01M 5/0091; G01M 1/365; G01M 13/04; G01M 17/03; G01M 5/0066; G01M 1/08; G01M 1/22; G01M 13/027; G01M 5/0033; G01M 1/00; G01M 1/122; G01M 15/044; G01M 3/24; G01M 3/2876; G01M 5/0075; G01M 1/06; G01M 1/12; G01M 1/24; G01M 1/32; G01M 1/36; G01M 11/081; G01M 13/023; G01M 13/025; G01M 17/00; G01M 17/0076; G01M 3/022; G01M 3/042; G01M 3/045; G01M 3/147; G01M 3/227; G01M 3/3236; G01M 5/0016; G01M 5/0025; G01M 5/0083; G01M 7/022; G01M 7/025; G01M 7/04; G01M 7/06; G01M 9/02; G01M 9/04; G01M 99/002; G01M 99/004; G01M 3/002; G01M 3/04; G01M 7/02; G01M 9/06
USPC .................................................. 73/146–146.8
See application file for complete search history.

(56) References Cited

U.S. PATENT DOCUMENTS

| | | | |
|---|---|---|---|
| 2007/0295095 A1* | 12/2007 | Kurtz | G01M 3/3236 |
| | | | 73/714 |
| 2013/0274988 A1 | 10/2013 | Reynes | |
| 2016/0229235 A1 | 8/2016 | Saint-Loup et al. | |
| 2022/0203784 A1* | 6/2022 | Verheijen | G07C 5/0808 |

FOREIGN PATENT DOCUMENTS

| | | | | |
|---|---|---|---|---|
| WO | 2015/044553 A1 | | 4/2015 | |
| WO | WO-2016151226 A1 * | | 9/2016 | ............ B60C 23/04 |
| WO | WO-2022158125 A1 * | | 7/2022 | |

* cited by examiner

METHODS FOR DETECTING AND LOCATING A THERMAL ANOMALY FOR A MOUNTED ASSEMBLY OF A VEHICLE

TECHNICAL FIELD OF THE INVENTION

The present invention relates to a method for detecting and locating a thermal anomaly in a mounted tyre-wheel assembly of a vehicle equipped with a pneumatic tyre. More specifically, the invention proposes to provide alerts in order to guarantee optimal operation of a vehicle.

TECHNICAL BACKGROUND OF THE INVENTION

It is known practice to monitor the pressure of the pneumatic tyres of a vehicle in order to meet standards and for safety purposes. The pressure monitoring is sometimes also coupled with the monitoring of the temperature of the internal cavity of the pneumatic tyre.

These monitoring operations are intended to inform the driver of any potential variations, deemed to be dangerous, in the pneumatic tyres of the vehicle and/or to provide feedback to the manager of the fleet to which the vehicle belongs, regarding characteristics of the pneumatic tyres of the vehicle.

SUMMARY OF THE INVENTION

It is an object of the invention to propose a method capable of determining new alerts pertaining to the vehicle and derived from the pressure and temperature monitoring already present on the tyre-wheel assemblies of the vehicle.

To that end, the invention relates to a method for detecting a thermal anomaly during running of a tyre-wheel assembly of a vehicle equipped with a mounting wheel on which a pneumatic tyre is mounted, characterized in that it comprises the following steps:

Measuring the internal pressure and temperature of the tyre-wheel assembly using a sensor attached to the mounting wheel;

Calculating a monitoring ratio which is a function of the measured pressure and of the measured temperature;

Repeating the preceding steps and tracking the evolution in the value of the monitoring ratio in order to determine a thermal anomaly when the internal temperature of the tyre-wheel assembly increases more rapidly than the internal pressure of the tyre-wheel assembly.

Advantageously, the detection method therefore makes it possible, using measurements at the level of a tyre-wheel assembly, to determine whether abnormal heating is present at the level of a component of the vehicle that is mounted close to the tyre-wheel assembly. Such a component may typically be all or part of a suspension system, of a drivetrain, or of a braking system. By way of entirely non-limiting example, the abnormal heating caused by malfunctioning brake pads or by a malfunction with the cooling of a motor may thus be detected at the level of the tyre-wheel assembly sensor. Specifically, as the sensor is in contact as a result of mounting or attachment to the mounting wheel, it is possible for the sensor to escape the constraints of Gay-Lussac's law and detect not only the temperature of the pressurized air in the tyre-wheel assembly but also that of the mounting wheel which is generally made of a thermally conducting material such as steel for example. As a result, the method is simple to implement and allows aids to maintenance and to correct operation of the vehicle to be added without the addition of further sensors.

Preferably according to the invention, the monitoring ratio corresponds to the ratio of the measured pressure to the measured temperature, and this allows a thermal anomaly to be determined using a simple calculation.

In addition, the invention relates to a method for locating a thermal anomaly on tyre-wheel assemblies of a vehicle, each of which is equipped with a mounting wheel on which a pneumatic tyre is mounted, characterized in that it comprises the following steps:

Implementing the thermal anomaly detection method as outlined hereinabove on a reference set comprising at least one tyre-wheel assembly selected from among the tyre-wheel assemblies of the vehicle, the monitoring ratio being a function of each of the tyre-wheel assemblies of the reference set;

Implementing the thermal anomaly detection method as outlined hereinabove on a comparison tyre-wheel assembly of the vehicle not belonging to the reference set;

Calculating the difference between the monitoring ratios of the reference set and of the tyre-wheel assembly compared during iterations in order to determine whether a thermal anomaly is coming from the reference set or from the compared tyre-wheel assembly.

Advantageously according to the invention, the location method allows the environment of each tyre-wheel assembly of a vehicle to be monitored one by one. Typically, the monitoring may be performed on all the tyre-wheel assemblies of the vehicle, or else each tyre-wheel assembly of a particular part of the vehicle such as, for example, all the tyre-wheel assemblies of the one same axle, only those of the driven part of the vehicle (automobile, lorry) or else only those of the trailed part of the vehicle (automobile, lorry, caravan, trailer). In addition, because each sensor is referenced by an identifier, even if, during maintenance, the tyre-wheel assemblies are replaced or swapped around, the thermal anomaly will still be located on the vehicle in the same way.

The invention may also have one or more of the following optional features, on their own or in combination.

The location method comprising, after the step of calculating the difference, a step of statistical discrimination making it possible, on the basis of the spread on the difference of the monitoring ratios of the reference set and of the tyre-wheel assembly, to remove those thermal anomalies that are associated with the statistical variations. Specifically, sensors have a (purely random) repeatability and a sensitivity to different usages (path, banking, speed, etc.) leading to a more or less extensive spread on the measurements. The purpose of the statistical discrimination step is to prevent this spread that is intrinsic to each sensor from leading to a false conclusion that there is a thermal anomaly. As a general rule, the pressure measurements are given to ±0.1 bar, and the temperature measurements to ±3° C.

According to a first variant in which the distribution law is considered to be not necessarily normal, the statistical discrimination step comprises the phases aimed at determining two quantiles of predetermined orders for the values obtained during the iterations of the step of calculating the difference between the monitoring ratios of the reference set and of the compared tyre-wheel assembly, and using the two quantiles of predetermined orders as, respectively, an upper threshold and a lower threshold between which thresholds each value of the difference is not considered to represent a thermal anomaly.

This is because the quantiles allow a predetermined range in which the spread is considered to have been induced by the precision of the measurements of the sensors of each tyre-wheel assembly or the usage to be immediately taken into consideration statistically. Thus, a first predetermined order that forms the lower threshold may be comprised between $10^{-4}$ and $10^{-1}$, and a second predetermined order that forms the upper threshold may be comprised between $1\text{-}10^{-4}$ and $1\text{-}10^{-1}$.

According to a second variant in which the distribution law is considered to be normal (a Gaussian distribution or a Laplace-Gauss distribution), the statistical discrimination step comprises the phase aimed at calculating the standard deviation of the values obtained during the iterations of the step of calculating the difference between the monitoring ratios of the reference set and of the compared tyre-wheel assembly. This is because the standard deviation allows the spread induced by the precision of the measurements of the sensors of each tyre-wheel assembly or the usage to be immediately taken into consideration statistically. From the above hypothesis of a normal distribution, the associated quantiles can be deduced directly.

The statistical discrimination step may then determine, from the standard deviation of the values obtained during the step of calculating the difference, an upper threshold and a lower threshold between which thresholds each value of the difference is not considered to represent a thermal anomaly. The range of values for which the variations are estimated not to be necessarily due to a thermal anomaly in the environment of the compared tyre-wheel assembly can thus be determined in advance.

The lower and upper thresholds correspond to plus or minus a factor F multiplied by the standard deviation of the values obtained in the step of calculating the difference, the factor F being comprised between 1 and 4. Thus, the upper and lower thresholds between which each value of the difference is not considered to represent a thermal anomaly can be adapted according to the application and the type of sensor. The way in which these thresholds are determined is by calculation from the mean of the measurements of the process plus or minus the factor F multiplied by the standard deviation. As a preference, the target mean value is around zero because it is the difference in two indicators which evolve with similar dynamics, give or take the measurement uncertainty and the usage.

According to a third variant in which there is a desire to centre and reduce the difference curves, the location method is repeated at least once in order to change the running conditions of the tyre-wheel assemblies. Next, the statistical discrimination step comprises the phases aimed at compiling the curves for each iteration of the method, calculating the mean value and standard deviation of the difference between the curves for each iteration of the method, calculating a corrected difference by subtracting the calculated difference of the current iteration from the calculated mean value, then by dividing this subtraction by the calculated standard deviation so as to determine the corrected difference which is less sensitive to the repeatability of the measurements and to the usage of the vehicle, determining two quantiles of predetermined orders for the corrected difference values and using the two quantiles of predetermined orders respectively as an upper threshold and as a lower threshold between which thresholds each value of the difference is not considered to be representative of a thermal anomaly.

Specifically, the corrected difference thus determined is less sensitive to the repeatability of the measurements and to the usage of the vehicle. Typically, between two identical or different path runnings, with identical or different tyre-wheel assemblies, it is possible to obtain between the curves a difference the order of magnitude of which is not of the same level. It is therefore proposed that the difference curve be centred and reduced, so as to dispense with, in the use of the method, the order of magnitude of the difference and therefore the usage made on the estimation scheme.

In addition, the quantiles allow a predetermined range in which the spread is considered to have been induced by the precision of the measurements of the sensors of each tyre-wheel assembly to be immediately taken into consideration statistically. Thus, a first predetermined order that forms the lower threshold may be comprised between $10^{-4}$ and $10^{-1}$, and a second predetermined order that forms the upper threshold may be comprised between $1\text{-}10^{-4}$ and $1\text{-}10^{-1}$.

Finally, the location method comprises a final step of issuing an alert when a thermal anomaly with one of the tyre-wheel assemblies of the vehicle is determined.

BRIEF DESCRIPTION OF THE DRAWINGS

Further particular features and advantages will become clearly apparent from the following description thereof, which is given by way of entirely non-limiting example, with reference to the appended drawings, in which.

DETAILED DESCRIPTION OF AT LEAST ONE EMBODIMENT OF THE INVENTION

In the various figures, elements that are identical or similar bear the same references, possibly supplemented by a suffix. The description of their structure and of their function is therefore not systematically repeated.

In all that follows, the orientations are the usual orientations of a motor vehicle. In particular, the terms "upper", "lower", "left", "right", "above", "below", "forwards" and "backwards" are generally understood to mean with respect to the normal direction in which the motor vehicle runs and to the position of the driver.

A "pneumatic tyre" means all types of resilient tread subjected to an internal pressure. The invention is applicable to any type of tyre, in particular those intended to be fitted on motor vehicles of the passenger vehicle or SUV ("Sport Utility Vehicle") type, two-wheel vehicles (in particular motorcycles), aircraft, industrial vehicles selected from vans, heavy transport vehicles, i.e. light rail vehicles, buses, heavy road transport vehicles (lorries, tractors and trailers), and off-road vehicles such as agricultural or construction plant vehicles, or other transport or handling vehicles. The invention is also applicable to non-motorized vehicles, in particular a trailer, a semi-trailer or a caravan.

Figure 1:
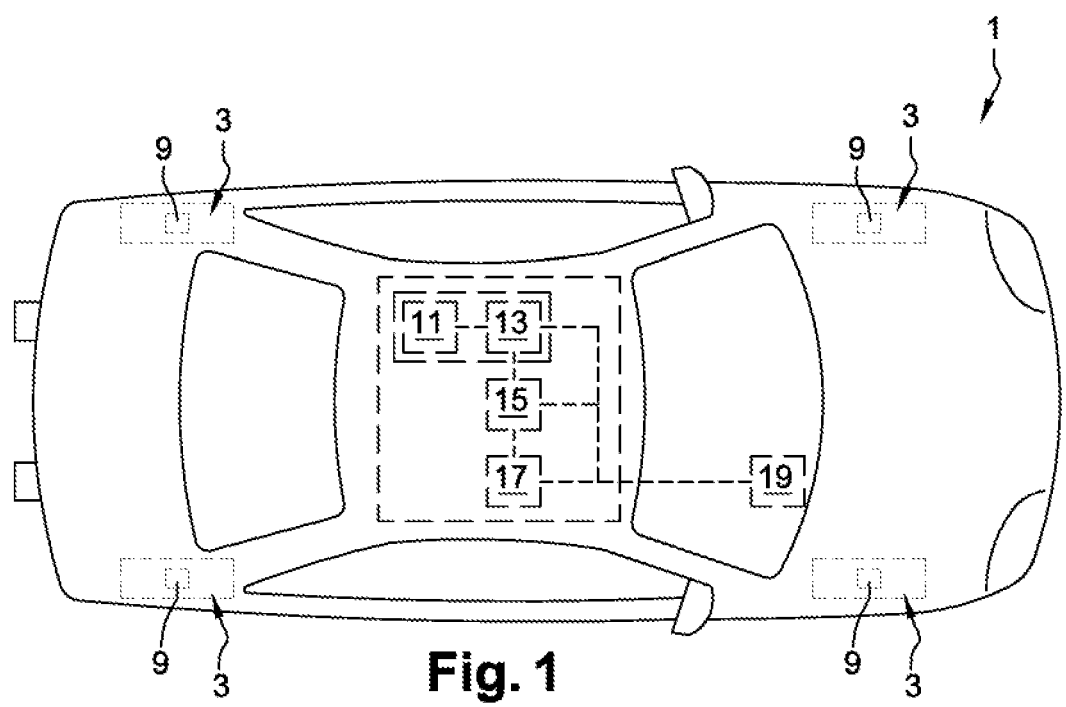
FIG. 1 is a schematic view from above of a motor vehicle comprising a method according to the invention.

FIG. 1 is a schematic view from above of a motor vehicle 1 comprising four tyre-wheel assemblies 3. In the usual way, each tyre-wheel assembly 3 comprises a mounting wheel 5 and a pneumatic tyre 7 as partially illustrated in FIG. 3. As explained above, particularly in the context of the management of a fleet comprising one or more vehicles, it is known practice to monitor the internal pressure P and the internal temperature T of each tyre-wheel assembly 3. Of course, in the case of a fleet, the vehicle may thus be a motorized or non-motorized vehicle, or both, such as, for example, a lorry moving a semitrailer. Each (driven or non-driven) tyre-wheel assembly 3 may thus comprise a sensor 9 intended to take these measurements.

Figure 2:
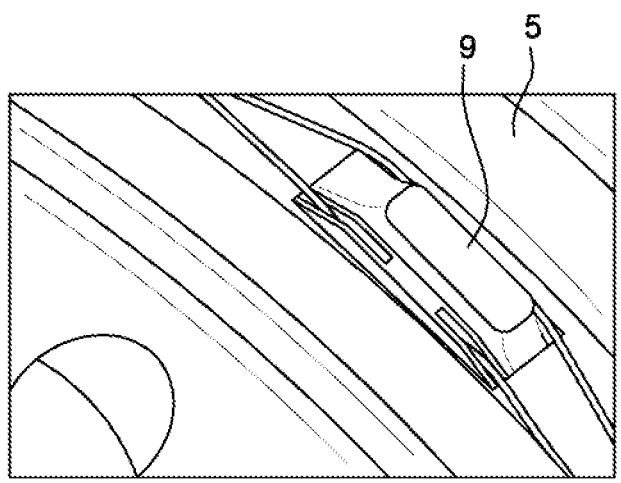
FIG. 2 is a partial perspective view of a mounting wheel equipped with a sensor able to monitor the pressure and the temperature of the internal cavity of a pneumatic tyre.

As a preference, the sensor 9 is attached or mounted on the mounting wheel 5, that is to say is in contact with the mounting wheel 5, as illustrated in FIG. 2. Of course, the mounting of the sensor 9 is not in any way restricted to the wall on which the pneumatic tyre 7 is mounted. In a variant, the sensor 9 could be in contact by mounting on the valve or away from the wall on which the pneumatic tyre 7 is mounted, such as on the disc of the mounting wheel 5.

Such fleet monitoring has yielded the discovery that sensors 9 can sometimes send back abnormal temperature signals, that is to say that one or more of the temperature signals T emitted by the sensors 9 of the tyre-wheel assemblies 3 may send a signal with a magnitude that is higher in comparison with the others. This higher magnitude may be caused by the sensor 9 having a different precision from the others, i.e. because it is measuring an overestimated value and/or exhibits too great a variation between values in the same conditions.

Figure 3:
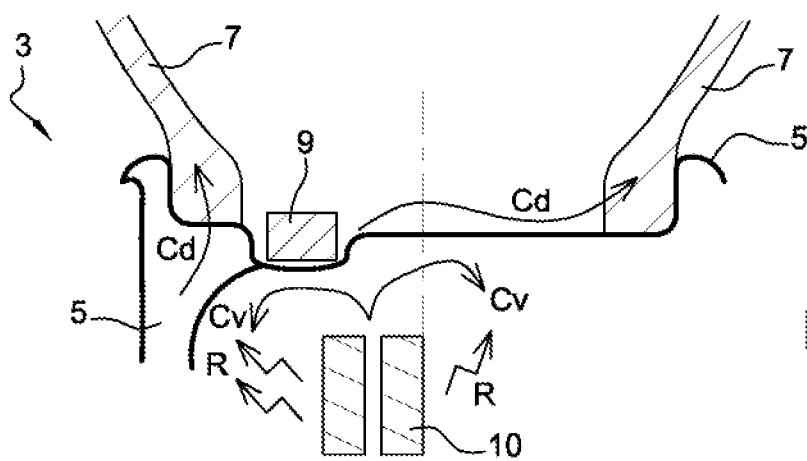
FIG. 3 is a schematic view in section of a tyre-wheel assembly equipped with the sensor of FIG. 2.

Following checks, and entirely unexpectedly, it was found that the thermal anomaly was in fact due to poor operation of the braking system of the vehicle 1. More specifically, defective brake calipers were not releasing the brake pads sufficiently from their disc 10, thus causing excessive heating of the latter. In fact, as can be seen in FIG. 3, as a result of the radiation R and the convection Cv coming from the disc 10 and as a result of the thermal conduction Cd in the tyre-wheel assembly 3, the sensor 9 is measuring a higher temperature value than the other sensors 9. The invention therefore proposes a method that makes it possible to determine whether temperature signals which are sometimes abnormal do warrant an alert.

Thus, the invention relates to a method for detecting a thermal anomaly during running of a tyre-wheel assembly 3 of a vehicle 1 equipped with a mounting wheel 5 on which a pneumatic tyre 7 is mounted. The detection method comprises a first step intended to measure the internal pressure P and internal temperature T of the tyre-wheel assembly 3 using a sensor 9 attached to the mounting wheel 5. This step can be performed using the sensors 9 of the tyre-wheel assemblies 3 that are already present on the vehicle 1. As visible in FIG. 2, the sensors 9 are preferably of the direct TPMS (Tyre Pressure Monitoring System) type. In order not to consume too much energy, the sensors 9 may transmit their measurements at regular or irregular intervals, such as, for example, at intervals of between 20 seconds and 30 minutes, and preferably between 30 seconds and 1 minute or, for example, 30 seconds then 1 minute, then 30 seconds again, and then 1 minute, and so on. Using a wired or unwired connection, a module 11 for processing the signals from the sensors 9 collects and, as a preference, logs, all the signals emitted by the sensors 9.

The detection method continues with a second step intended to calculate a monitoring ratio which is a function of the measured pressure P and of the measured temperature T. As a preference, the monitoring ratio corresponds to the ratio P/T of the measured pressure P to the measured temperature T.

Specifically, assuming no air leaks and assuming that the quantity of material is constant, then according to the Gay-Lussac law, each tyre-wheel assembly obeys the following relationship:

$$\frac{P1}{T1} = \frac{P2}{T2} = f(V, n)$$

where V is the volume and n the quantity of material in the cavity of the tyre-wheel assembly 3.

Figure 4A:
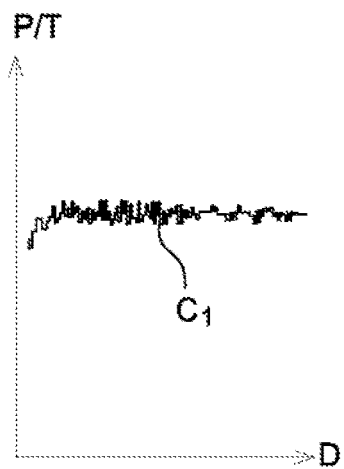
FIG. 4a is a diagram showing how the ratio of the pressure to the temperature measured by the sensor according to FIG. 2 evolves over the course of time.
Figure 4B:
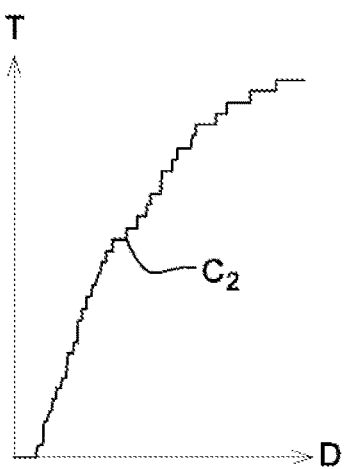
FIG. 4b is a diagram showing how the temperature signal from the sensor of FIG. 2 evolves over the course of time.
Figure 4C:
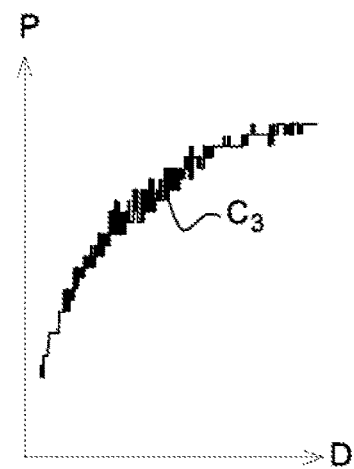
FIG. 4c is a diagram showing how the pressure signal from the sensor of FIG. 2 evolves over the course of time.

Empirically, as can be seen in FIGS. 4a to 4c, even if the temperature T increases (curve $C_1$), so too does the pressure P (curve $C_2$). As a result, under normal conditions the function $f(V,n)$ remains substantially constant, which is to say that the ratio P/T (curve $C_3$) of pressure P to temperature T should remain constant. As a preference, a check is therefore made to determine whether or not this ratio P/T remains constant. Specifically, because the sensor 9 is attached to, i.e. in contact with, the mounting wheel 5, it is possible for it to escape the constraints of Gay-Lussac's law and detect not only the temperature of the pressurized air in the tyre-wheel assembly 3 but its own temperature induced by the thermal conduction from the mounting wheel 5 which is itself subjected to the radiation R, convection Cv and thermal conduction Cd.

Figure 7:
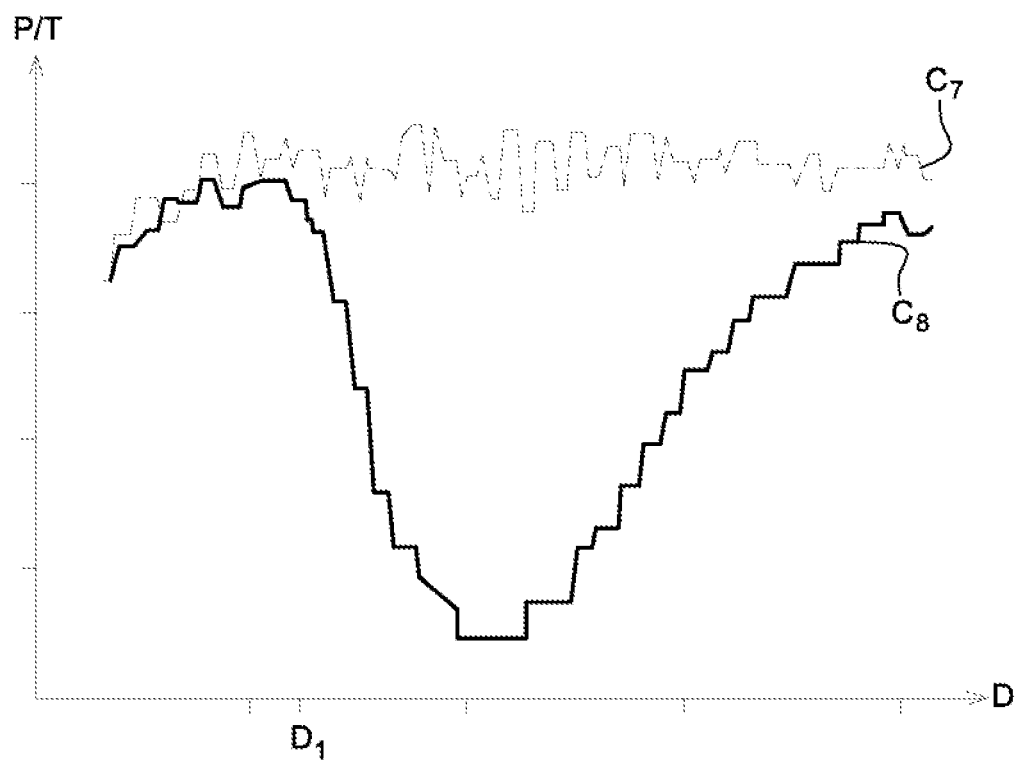
FIG. 7 is a diagram showing the abnormal way in which the ratio of the pressure to the temperature of a reference pneumatic tyre evolves over the course of time in comparison with that of another pneumatic tyre of the vehicle.

This second step may be performed using a calculation module 13 that calculates the monitoring ratio. Specifically, as can be seen in curve C8 of FIG. 7, a thermal anomaly can quickly be detected by the fact that curve C8 drops off quickly, which is to say that the temperature T in increases more rapidly than the pressure P. A thermal anomaly, rather than a variation in the precision of the sensor 9, can therefore be determined with greater certainty than through simple calculation.

The detection method repeats the first and second steps so that the way in which the value of the monitoring ratio evolves can be tracked and, incidentally, a potential thermal anomaly determined. The repeated iterations can be performed at regular intervals such as, for example, at an interval of between 20 seconds and 30 minutes and, for preference, between 30 seconds and 1 minute. The detection method may thus comprise a final step of issuing an alert when a thermal anomaly with one of the tyre-wheel assemblies 3 of the vehicle is determined (from $D_1$ in curve $C_8$ of FIG. 7) or, alternatively, from several consecutive anomalies such as, for example, between 2 and 10 consecutive anomalies depending on the sampling frequency. More specifically, the detection method may issue a thermal anomaly alert on the on-board network 19 of the vehicle 1 to transmit it to the manager of the fleet of the vehicle 1 and/or to display it to the driver of the vehicle 1.

Advantageously, the detection method therefore makes it possible, using measurements at the level of a tyre-wheel assembly 3, to determine whether abnormal heating is present at the level of a component of the vehicle 1 that is mounted close to the tyre-wheel assembly 3. Such a component may typically be all or part of a suspension system, of a drivetrain, or of a braking system. By way of entirely non-limiting example, the abnormal heating caused by the malfunctioning of the brake pads as explained hereinabove might not be the only source of heating. By way of example, the heating could also be the result of defective cooling of a motor housed in the mounting wheel 5. In the light of the foregoing, it will be appreciated that the method is simple to implement and allows aids to maintenance and to correct operation of the vehicle to be added without the addition of further sensors.

The invention also proposes a more refined method for determining whether these temperature signals which are sometimes abnormal do warrant an alert. Thus, the invention relates to a method for locating a thermal anomaly on tyre-wheel assemblies 3 of a vehicle 1 each of which is equipped with a mounting wheel 5 on which a pneumatic tyre 7 is mounted.

The location method comprises a first step intended to implement the thermal anomaly detection method as outlined hereinabove on a reference set comprising at least one tyre-wheel assembly 3 selected from among the tyre-wheel assemblies 3 of the vehicle 1, the monitoring ratio being a function of each of the tyre-wheel assemblies 3 of the reference set. It will therefore be appreciated that the monitoring ratio (curve $C_4$ in FIG. 5) for the reference set can be obtained from one or more tyre-wheel assemblies 3 belonging, for example, to the one same axle or to the one same vehicle 1. Of course, in the case of several tyre-wheel assemblies 3, an arithmetic mean of the measurements and/or of the monitoring ratio for each tyre-wheel assembly 3 of the reference set may be calculated.

Next, at the same time as the first step (or before or after), the location method comprises a second step intended to implement the thermal anomaly detection method as outlined hereinabove on a comparison tyre-wheel assembly 3 of the vehicle 1 that does not belong to the reference set. The objective is to check each thermal environment of the tyre-wheel assemblies 3 of the vehicle 1 one by one in order to be able to discriminate possible particular usage of the vehicle 1 by comparing its monitoring ratio (curve $C_5$ of FIG. 5) with that (curve $C_4$ of FIG. 5) of the reference set.

The location method then executes a third step intended to calculate the difference $\Delta(P/T)$ between the monitoring ratios P/T of the reference set and the tyre-wheel assembly 3 compared during the iterations. This third step may be implemented by a calculation module 15 that calculates the difference $\Delta(P/T)$ in the ratios P/T in order, for example, to obtain the curve $C_6$ illustrated in FIG. 6.

Figure 5:
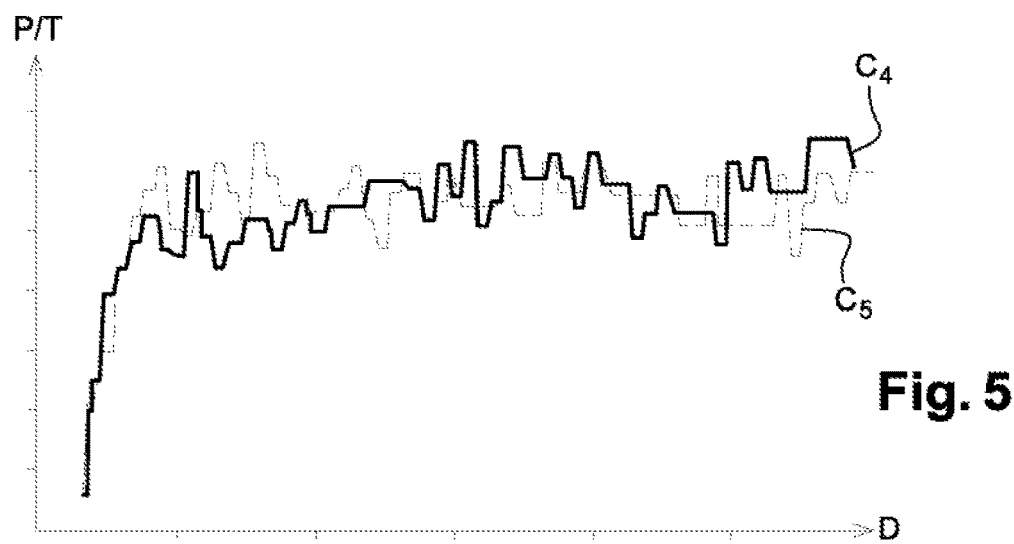
FIG. 5 is a diagram showing the usual way in which the ratio of the pressure to the temperature of a reference pneumatic tyre evolves over the course of time in comparison with that of another pneumatic tyre of the vehicle.
Figure 6:
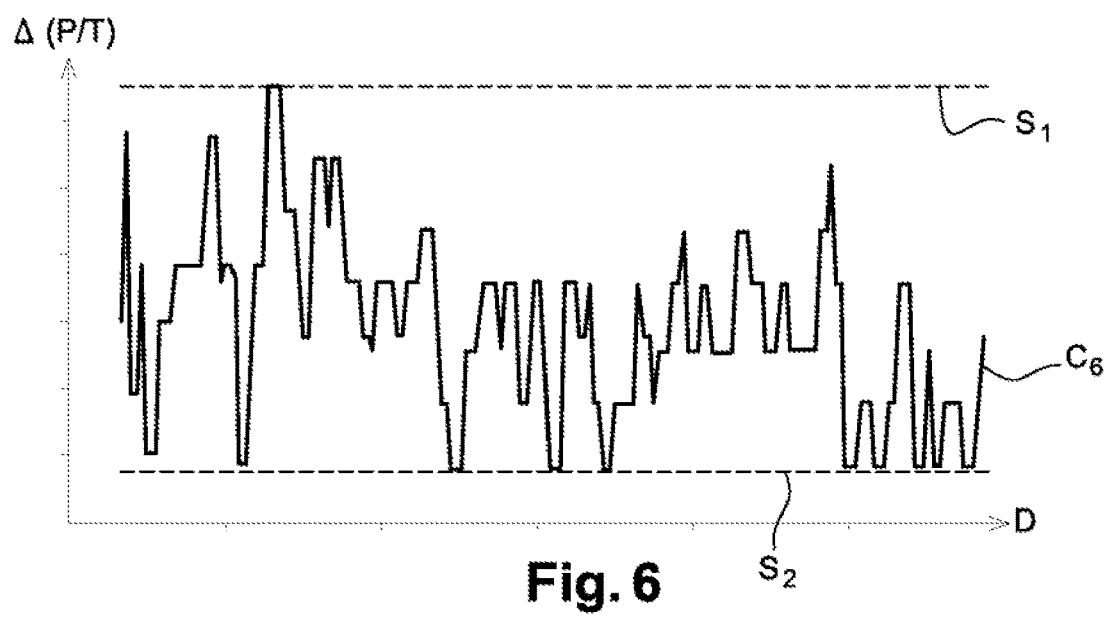
FIG. 6 is a diagram showing the usual difference over the course of time between the two ratios illustrated in FIG. 5.

With respect to FIGS. 4a to 4c, it should be appreciated that FIGS. 5 and 6 are working with far greater precisions, namely that the location method works in much finer detail. Therefore the scales in FIGS. 5 and 6 are considerably larger than those of FIGS. 4a to 4c.

This third step makes it possible quickly to determine if a thermal anomaly is not in fact due to a particular usage of the vehicle 1 and whether it stems from the reference set or from the compared tyre-wheel assembly 3. A potential thermal anomaly can therefore be located by comparison. The location method may thus comprise a final step of issuing an alert when a thermal anomaly with one of the tyre-wheel assemblies 3 of the vehicle is determined (from $D_1$ in curve $D_8$ of FIG. 7) or, alternatively, from several consecutive anomalies such as, for example, between 2 and 10 consecutive anomalies depending on the sampling frequency. More specifically, the location method may issue a thermal anomaly alert on the on-board network 19 of the vehicle 1 to transmit it to the manager of the fleet of the vehicle 1 and/or to display it to the driver of the vehicle 1.

Advantageously, the location method allows the environment of each tyre-wheel assembly 3 of a vehicle 1 to be monitored one by one. Typically, the monitoring may be performed on all the tyre-wheel assemblies 3 of the vehicle 1, or else each tyre-wheel assembly 3 of a particular part of the vehicle 1 such as, for example, all the tyre-wheel assemblies 3 of the one same axle, only the driven tyre-wheel assemblies 3 of the vehicle 1 (automobile, lorry) or else only the trailed tyre-wheel assemblies 3 of the vehicle 1 (automobile, lorry, caravan, trailer).

In addition, because each sensor 9 is referenced by an identifier, even if, during maintenance, the tyre-wheel assemblies 3 are replaced or swapped around, the thermal anomaly will still be located on the vehicle 1 in the same way. More specifically, the position corresponding to the identifier can be discovered by interrogating the sensors 9 of the tyre-wheel assemblies 3 using its dedicated communications system at the time of preventive maintenance (inspecting the components of the vehicle 1 around the tyre-wheel assembly 3 that has been identified) following receipt of the thermal-anomaly alert on the on-board network 19 of the vehicle 1, and transmission to the fleet manager for the vehicle 1 and/or the display to the driver of the vehicle 1.

Figure 8:
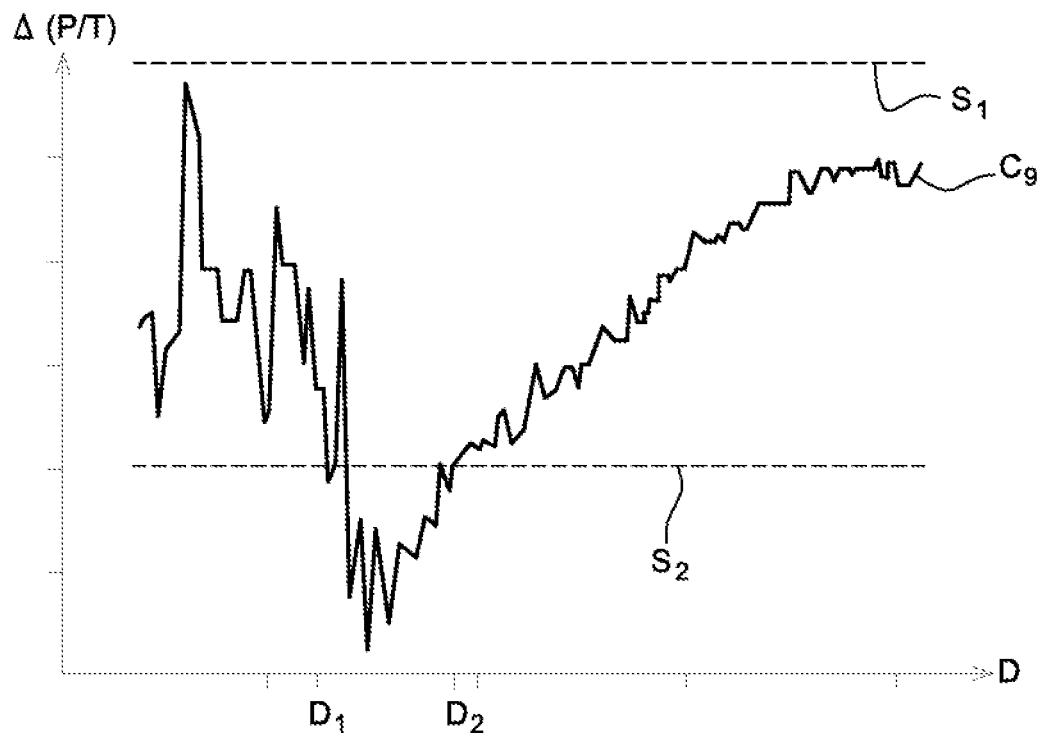
FIG. 8 is a diagram showing the abnormal difference over the course of time between the two ratios illustrated in FIG. 7.

As a preference, the location method comprises, after the third step of calculating the difference $\Delta(P/T)$, a fourth step of statistical discrimination that, on the basis of the spread on the difference in the monitoring ratios and/or the measurements of the internal pressure P and internal temperature T of each tyre-wheel assembly 3, allows the removal of those thermal anomalies that are associated with the statistical variations induced by the calculations and/or the measurements. This fourth step can be implemented by a statistical calculation module 17 in order to obtain, for example, the thresholds $S_1$ and $S_2$ illustrated in FIGS. 6 and 8 and between which thresholds the differences in monitoring ratios are deemed to be "normal".

Specifically, the modules 11, 13, 15 and the sensors 9 have a (purely random) repeatability and a sensitivity to different usages (path, banking, load, speed, etc.) leading to a more or less extensive spread. The purpose of the statistical discrimination step is to prevent this spread that is intrinsic to the elements used for implementing the method from leading to a false conclusion that there is a thermal anomaly. As a general rule, the pressure measurements are given to ±0.1 bar, and the temperature measurements to ±3° C.

According to a first variant in which the distribution law is considered to be not necessarily a normal distribution, the statistical discrimination step comprises a first phase intended to determine two quantiles $q_\alpha$, $q_{1-\alpha}$ of predetermined orders $\alpha$, $1-\alpha$ for the values (curves $C_4$ and/or $C_5$ and/or $C_6$ of FIGS. 5 and 6) obtained during the iterations of the step of calculating the difference $\Delta(P/T)$ between the monitoring ratios P/T of the reference set and of the compared tyre-wheel assembly.

The value $\alpha$ may thus be comprised between $10^{-4}$ and $10^{-1}$. The value $\alpha$ may, for example, be equal to 0.0001, 0.0005, 0.001, 0.005, 0.0075, 0.01, 0.015, 0.02, 0.05 or 0.1 depending on the desired probability of risk of false detection of a thermal anomaly. As a preference, the value $\alpha$ is equal to $10^{-2}$.

A second phase of the first variant is intended to use the two quantiles $q_\alpha$, $q_{1-\alpha}$ of predetermined orders $\alpha$, $1-\alpha$ respectively as an upper threshold $S_1$ and as a lower threshold $S_2$ between which thresholds each value of the difference is not considered to represent a thermal anomaly. Therefore, a first predetermined order a may form the lower threshold $S_2$ comprised between $10^{-4}$ and $10^{-1}$ and a second predetermined order $1-\alpha$ may form the upper threshold $S_1$ comprised between $1\text{-}10^{-4}$ and $1\text{-}10^{-1}$.

Specifically, the quantiles allow a predetermined range in which the spread is considered to have been induced by the precision of the measurements of the sensors 9 of each tyre-wheel assembly 3 to be immediately taken into consideration statistically. Therefore the higher the value $\alpha$, the lower the selectivity, with the risk of detecting thermal anomalies which in fact are not. Conversely, the lower the value $\alpha$, the greater the selectivity, with the risk that the thermal anomalies may not be systematically detected.

According to a second variant in which the distribution law is considered to be a normal distribution, the statistical discrimination step comprises the phase intended to calculate the standard deviation $\sigma$ ("sigma") of the values (curves $C_4$ and/or $C_5$ and/or $C_6$ of FIGS. 5 and 6) obtained during the iterations of the step of calculating the difference $\Delta(P/T)$ between the monitoring ratios of the reference set and of the compared tyre-wheel assembly 3. This is because the standard deviation $\sigma$ allows the spread induced by the precision of the signals for each tyre-wheel assembly 3 to be immediately taken into consideration statistically.

The statistical discrimination step makes it possible to determine, from the standard deviation $\sigma$ of the values obtained during the step of calculating the difference $\Delta(P/T)$, an upper threshold $S_1$ and a lower threshold $S_2$ between which thresholds each value of the difference $\Delta(P/T)$ is not considered to represent a thermal anomaly. The range of values for which the variations in the difference $\Delta(P/T)$ are not necessarily due to a thermal anomaly in the environment of the compared tyre-wheel assembly 3 is thus determined in advance. It will thus be appreciated that, depending on which of the thresholds $S_1$, $S_2$ is crossed, it can be determined whether it is the monitoring ratio of the reference set or that of the compared tyre-wheel assembly 3 that is exhibiting a thermal anomaly.

Preferentially, the lower and upper thresholds $S_1$, $S_2$ correspond to plus or minus a factor F multiplied by the standard deviation ($\pm F \cdot \sigma$) of the values obtained in the step of calculating the difference, the factor F being comprised between 1 and 4. By way of example, the factor F could thus be comprised between 2 and 3 such as, for example, equal to 2, 2.1, 2.2, 2.3, 2.4, 2.5, 2.6, 2.7, 2.8, 2.9 or 3. Thus, the upper and lower thresholds $S_1$, $S_2$ between which each value of the difference $\Delta(P/T)$ is not considered to represent a thermal anomaly can be adapted according to the application, the tyre-wheel assembly 3 and the type of sensor 9. More specifically, the higher the factor F, the greater the selectivity, with the risk that the thermal anomalies may not be systematically detected. Conversely, the lower the factor F, the lower the selectivity, with the risk of detecting thermal anomalies which in fact are not.

According to a third variant in which there is a desire to centre and reduce the difference curves, the location method is repeated at least once, and preferably several times, in order to obtain different running conditions of the tyre-wheel assemblies 3. Furthermore, the statistical discrimination step comprises a first phase intended to compile the curves for each iteration of the location method, and then a second phase intended to calculate the mean value $\bar{x}$ and the standard deviation $\sigma$ of the difference between the curves for each iteration of the method.

A third phase is intended to calculate a corrected difference $\Delta(P/T)$ by subtracting the calculated difference $\Delta(P/T)$ of the current iteration from the calculated mean value $\bar{x}$, then by dividing this subtraction by the calculated standard deviation $\sigma$ so as to determine the corrected difference $\Delta(P/T)$. The corrected difference $\Delta(P/T)$ thus determined is less sensitive to the repeatability of the measurements and to the usage of the vehicle. Typically, between two identical or different path runnings, with identical or different tyre-wheel assemblies 3, it is possible to obtain between the curves a difference the order of magnitude of which is not of the same level. It is therefore proposed that the difference curve be centred and reduced, so as to dispense with, in the use of the method, the order of magnitude of the difference and therefore the usage made on the estimation scheme (curve $C_9$ of FIG. 8).

As in the first variant, the third variant also comprises a fourth phase intended to determine two quantiles $q_\alpha$, $q_{1-\alpha}$ of predetermined orders $\alpha$, $1-\alpha$ for the corrected difference values $\Delta(P/T)$, and to use the two quantiles $q_\alpha$, $q_{1-\alpha}$ of predetermined orders $\alpha$, $1-\alpha$ in a last phase, respectively as an upper threshold $S_1$ and as a lower threshold $S_2$ between which thresholds each value of the difference is not considered to represent a thermal anomaly.

The value $\alpha$ may thus be comprised between $10^{-4}$ and $10^{-1}$. The value $\alpha$ may, for example, be equal to 0.0001, 0.0005, 0.001, 0.005, 0.0075, 0.01, 0.015, 0.02, 0.05 or 0.1 depending on the desired probability of risk of false detection of a thermal anomaly. As a preference, the value $\alpha$ is equal to $10^{-2}$. Therefore, a first predetermined order $\alpha$ may form the lower threshold $S_2$ comprised between $10^{-4}$ and $10^{-1}$ and a second predetermined order $1-\alpha$ may form the upper threshold $S_1$ comprised between $1\text{-}10^{-4}$ and $1\text{-}10^{-1}$.

Advantageously, the quantiles $q_\alpha$, $q_{1-\alpha}$ allow a predetermined range in which the spread is considered to have been induced by the precision of the measurements of the sensors 9 of each tyre-wheel assembly 3 to be immediately taken into consideration statistically. Therefore the higher the value $\alpha$, the lower the selectivity, with the risk of detecting thermal anomalies which in fact are not. Conversely, the lower the value $\alpha$, the greater the selectivity, with the risk that the thermal anomalies may not be systematically detected.

The location method according to the first, second or third variant may thus comprise a final step of issuing an alert when a thermal anomaly with one of the tyre-wheel assemblies 3 of the vehicle 1 is determined (between $D_1$ and $D_2$ in curve $C_9$ of FIG. 8 by the crossing of the threshold $S_2$) or, alternatively, from several consecutive anomalies such as, for example, between 2 and 10 consecutive anomalies depending on the sampling frequency. By way of example, the issuing of an alert may be instigated as a result of repeated detection of a thermal anomaly (for example between two and ten anomalies) in a given time (for example over the course of the last ten minutes). More specifically, the location method may issue a thermal anomaly alert on the on-board network 19 of the vehicle 1 to transmit it to the manager of the fleet of vehicles 1 and/or to display it to the driver of the vehicle 1.

The invention is not limited to the embodiments and variants presented and other embodiments and variants will be clearly apparent to a person skilled in the art. It is notably possible to adapt the detection method and/or the location method according to the component of the vehicle 1 that is to be monitored. Thus, the thresholds $S_1$, $S_2$ might, for example, take into consideration the size of the space between the outside diameter of the brake disc 10 and the inside diameter of the mounting wheel 5.

As a variant or in addition, the detection method and/or the location method might also take into consideration only the detection of those tyre-wheel assemblies 3 that are actually touching the roadway so as not to monitor a possible raised-up axle of a trailer for example.

Finally, it is notably possible to carry out the methods using an indirect stream of information via a server in which there are performed statistical processing operations regarding the history of the information and an analysis of massive data that would make it possible to address the problem of how the monitoring ratio evolves by using remote sources of information. By way of example, a processing of massive data with management of the data history might be carried out in order to incorporate the effects that the wearing of the tyre-wheel assemblies 3, the loading of the tyre-wheel assemblies 3, the speed of the vehicle 1, characteristics (winding nature, banking, etc.) of the road that the vehicle 1 encounters, or else the grip of the tyre-wheel assemblies 3, has/have on the value of the monitoring ratio. Specifically, use might for example be made of a device, external to the vehicle, for measuring wear and which, when the vehicle 1 is being serviced or passes through an automatic-detection gantry, increments the number of kilometres covered by the pneumatic tyres 7.

According to another example, a dated map of the information measured on the vehicle or on other vehicles equipped with the same device could be created. Thus, each measurement could be sent to a server containing the information pertaining to the measured value, the geographical location of the road on which the measurement was taken, the date of the measurement (day, and time in hours and minutes) and other measured parameters (such as, for example, the load per axle, the speed, the acceleration or the banking). A processing of the massive data could then be performed in order the better to estimate the law of the monitoring ratios. As a result, using the above method or any other method based on this information, the estimation of the probable anomaly detection thresholds would be more refined. It might also be possible to make a distinction between families of vehicle and/or types of usage on the basis of these massive data by using statistical methods, machine learning engines, artificial intelligence, in order to perform this segmentation (also known as "clustering"). For each segment, the above approach or a suitable similar approach can be used. Additional segmentation can be achieved by knowing the wear, using this knowledge alone or combined with other parameters. This knowledge regarding wear could be gathered when the vehicle is being serviced, passes through a gantry, or is instrumented with an external device.

The invention claimed is:

1. A method for locating a thermal anomaly on tire-wheel assemblies of a vehicle, each of which is equipped with a mounting wheel on which a pneumatic tire is mounted, the method comprising:
   implementing, on a reference set comprising at least one tire-wheel assembly selected from among the tire-wheel assemblies of the vehicle, a method for detecting a thermal anomaly comprising the steps of
   measuring an internal pressure P and temperature T of the tire-wheel assembly using a sensor attached to the mounting wheel,
   calculating a monitoring ratio P/T which is a function of the measured pressure P and of the measured temperature T and a function of each of the tire-wheel assemblies of the reference set, and
   repeating the preceding steps and tracking an evolution in a value of the monitoring ratio P/T in order to determine a thermal anomaly when the internal temperature of the tire-wheel assembly increases more rapidly than the internal pressure of the tire-wheel assembly;
   implementing the method for detecting the thermal anomaly on a comparison tire-wheel assembly of the vehicle not belonging to the reference set; and
   calculating a difference ΔP/T between the monitoring ratios P/T of the reference set and of the tire-wheel assembly compared during iterations in order to determine whether a thermal anomaly is coming from the reference set or from the compared tire-wheel assembly.

2. The method according to claim 1, further comprising, after the step of calculating the difference ΔP/T, a step of statistically discriminating, on a basis of a spread on the difference of the monitoring ratios P/T of the reference set and of the compared tire-wheel assembly, to remove thermal anomalies that are associated with statistical variations.

3. The method according to claim 2, wherein the statistical discrimination step comprises the following phases:
   determining two quantiles, qα and q1−α, of predetermined orders, α and 1−α, for values obtained during iterations of the step of calculating the difference ΔP/T between the monitoring ratios P/T of the reference set and of the compared tire-wheel assembly; and
   using the two quantiles, qα and q1−α, of predetermined orders, α and 1−α, respectively as an upper threshold S1 and as a lower threshold S2 between which thresholds each value of the difference ΔP/T is not considered to represent a thermal anomaly.

4. The method according to claim 3, wherein the predetermined orders, α and 1−α, are respectively comprised between $10^{-4}$ and $10^{-1}$ and between $1-10^{-4}$ and $1-10^{-1}$.

5. The method according to claim 2, wherein the statistical discrimination step comprises the following phase:
   calculating a standard deviation σ for values obtained during iterations of the step of calculating the difference ΔP/T between the monitoring ratios P/T of the reference set and of the compared tire-wheel assembly.

6. The method according to claim 5, wherein the statistical discrimination step determines, from the standard deviation σ of the values obtained during the step of calculating the difference ΔP/T, an upper threshold S1 and a lower threshold S2 between which thresholds each value of the difference ΔP/T is not considered to represent a thermal anomaly.

7. The method according to claim 6, wherein the upper threshold S1 and the lower threshold S2 correspond to plus or minus a factor F multiplied by the standard deviation σ of the values obtained in the step of calculating the difference ΔP/T, the factor F being between 1 and 4.

8. The method according to claim 2, which is repeated at least once in order to change running conditions of the tire-wheel assemblies, the statistical discrimination step comprising the following phases:

compiling curves for each iteration of the method;

calculating a mean $\bar{x}$ and a standard deviation $\sigma$ of a difference between the curves for each iteration of the method;

calculating a corrected difference by subtracting the calculated difference $\Delta P/T$ of the current iteration from the calculated mean value $\bar{x}$, then by dividing a difference therebetween by the calculated standard deviation $\sigma$ to determine the corrected difference which is less sensitive to repeatability of the measurements and to usage of the vehicle;

determining two quantiles, $q\alpha$ and $q1-\alpha$, of predetermined orders, $\alpha$ and $1-\alpha$, for the corrected difference values; and using the two quantiles, $q\alpha$ and $q1-\alpha$, of predetermined orders, $\alpha$ and $1-\alpha$, respectively as an upper threshold S1 and as a lower threshold S2 between which thresholds each value of the difference $\Delta P/T$ is not considered to represent a thermal anomaly.

9. The method according to claim 8, wherein the predetermined orders, $\alpha$ and $1-\alpha$, are respectively comprised between $10^{-4}$ and $10^{-1}$ and between $1-10^{-4}$ and $1-10^{-1}$.

10. The method according to claim 1, further comprising a final step of issuing an alert when a thermal anomaly with one of the tire-wheel assemblies of the vehicle is determined.

* * * * *